United States Patent
Wu et al.

(10) Patent No.: US 10,386,528 B2
(45) Date of Patent: Aug. 20, 2019

(54) METHOD FOR ESTIMATING FORMATION DIP AZIMUTH AND ECCENTERING AZIMUTH

(71) Applicant: Schlumberger Technology Corporation, Sugar Land, TX (US)

(72) Inventors: Peter T. Wu, Missouri City, TX (US); Mark T. Frey, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 429 days.

(21) Appl. No.: 14/853,322

(22) Filed: Sep. 14, 2015

(65) Prior Publication Data
US 2017/0075024 A1    Mar. 16, 2017

(51) Int. Cl.
*G01V 3/30* (2006.01)
(52) U.S. Cl.
CPC ...................................... *G01V 3/30* (2013.01)
(58) Field of Classification Search
None
See application file for complete search history.

(56) References Cited

U.S. PATENT DOCUMENTS

| | | | |
|---|---|---|---|
| 7,239,145 B2 | 7/2007 | Homan et al. | |
| 9,091,791 B2 | 7/2015 | Rabinovich et al. | |
| 9,448,324 B2 | 9/2016 | Frey | |
| 9,784,880 B2 | 10/2017 | Frey | |
| 2008/0033654 A1* | 2/2008 | Bespalov | G01V 3/28 702/7 |
| 2010/0097067 A1 | 4/2010 | Synder, Jr. et al. | |
| 2010/0198569 A1* | 8/2010 | Wu | G01V 3/38 703/6 |
| 2010/0283469 A1* | 11/2010 | Wang | G01V 3/30 324/338 |
| 2011/0074427 A1 | 3/2011 | Wang et al. | |
| 2011/0238312 A1 | 9/2011 | Seydoux et al. | |
| 2012/0105076 A1* | 5/2012 | Li | G01V 3/24 324/601 |
| 2012/0217968 A1* | 8/2012 | Seydoux | E21B 47/01 324/338 |

(Continued)

FOREIGN PATENT DOCUMENTS

WO    2008137987 A1    11/2008

OTHER PUBLICATIONS

U.S. Appl. No. 14/549,396, filed Nov. 20, 2014.
(Continued)

*Primary Examiner* — Herve-Louis Y Assouman

(57) ABSTRACT

A method for making downhole electromagnetic logging measurements includes using an electromagnetic measurement tool to acquire the measurements while rotating in a subterranean wellbore. Received electromagnetic waves are processed to obtain harmonic voltage coefficients, ratios of which are in turn further processed to compute gain compensated measurement quantities. The gain compensated measurement quantities are further processed to compute at least one of an apparent formation azimuth of the formation through which the wellbore traverses, an apparent tool eccentering azimuth, and an eccentering distance of the logging tool in the wellbore.

9 Claims, 13 Drawing Sheets

(56) References Cited

U.S. PATENT DOCUMENTS

2014/0107929 A1* 4/2014 Zhong .................. G01V 3/26
702/7
2014/0368197 A1 12/2014 Wang

OTHER PUBLICATIONS

U.S. Appl. No. 14/325,797, filed Jul. 8, 2014.
International Search Report and Written Opinion issued in International Patent application PCT/US2016/049551, dated Dec. 14, 2016. 14 pages.
International Preliminary Report on Patentability issued in International Patent application PCT/US2016/049551, dated Mar. 20, 2018, 9 pages.

* cited by examiner

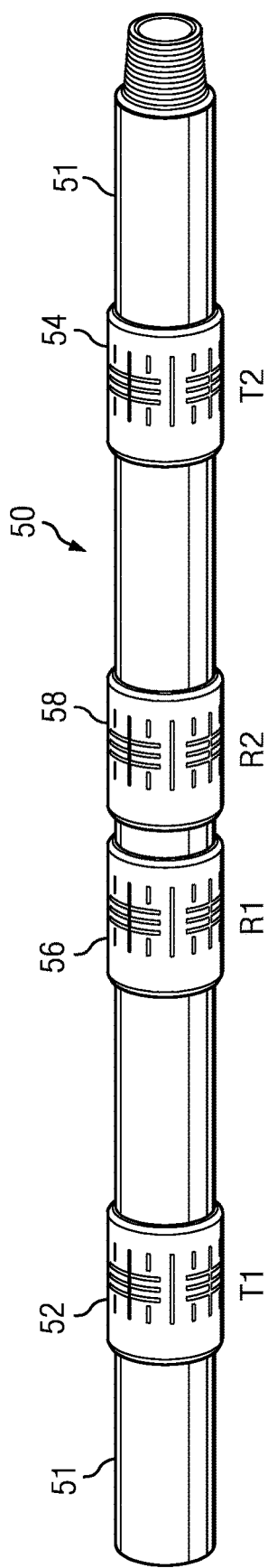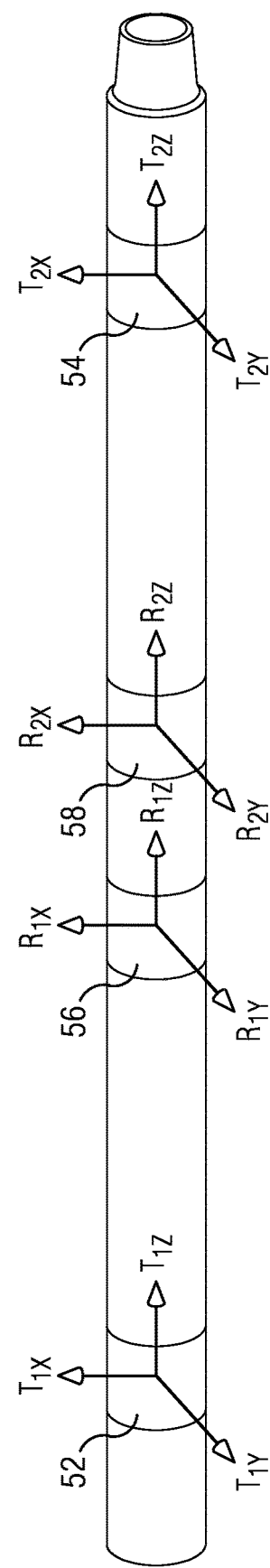
FIG. 2A
FIG. 2B

METHOD FOR ESTIMATING FORMATION DIP AZIMUTH AND ECCENTERING AZIMUTH

CROSS REFERENCE TO RELATED APPLICATIONS

None.

FIELD OF THE INVENTION

Disclosed embodiments relate generally to downhole electromagnetic logging methods and more particularly to a logging tool and methods for estimating formation dip azimuth and tool eccentering azimuth using gain compensated directional propagation measurements.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed e.g., in pay-zone steering applications, to provide information upon which steering decisions may be made.

Downhole electromagnetic measurements may be inverted at the surface using a formation model to obtain various useful formation parameters. However, a large number of formation and wellbore properties are known to affect the electromagnetic measurements, for example, including horizontal and vertical resistivities, the resistivity of and distance to a remote bed, relative dip angle, dip azimuth direction, drilling fluid resistivity, borehole diameter, tool eccentering distance, and the tool eccentering azimuth angle. Finite element modeling indicates that the electromagnetic measurements depend on the above parameters in a highly complicated manner such that obtaining an accurate inversion tends to be problematic.

SUMMARY

A method for making downhole electromagnetic logging measurements of a subterranean formation is disclosed. An electromagnetic logging tool including a transmitter having axial transmitting antenna and at least one transverse transmitting antenna and a receiver having an axial receiving antenna and at least one transverse receiving antenna is used to obtain electromagnetic measurements while rotating the tool in a wellbore. The received electromagnetic waves are processed to obtain harmonic voltage coefficients, ratios of which are in turn further processed to compute gain compensated measurement quantities. The gain compensated measurement quantities are further processed to compute at least one of an apparent formation azimuth of the formation through which the wellbore traverses, an apparent tool eccentering azimuth, and an eccentering distance of the logging tool in the wellbore.

The disclosed embodiments may provide various technical advantages. For example, the disclosed methodology may significantly simplify subsequent inversion processes for obtaining borehole and formation parameters. For example, by providing one or more of the apparent formation azimuth, apparent tool eccentering azimuth, and the eccentering distance, disclosed methods reduce the number of unknown parameters in the inversion and thereby improve reliability and accuracy.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 2A depicts one example of the electromagnetic logging tool shown on FIG. 1.

FIG. 2B schematically depicts the antenna moments in an electromagnetic logging tool including triaxial transmitters and receivers.

DETAILED DESCRIPTION

Figure 1:
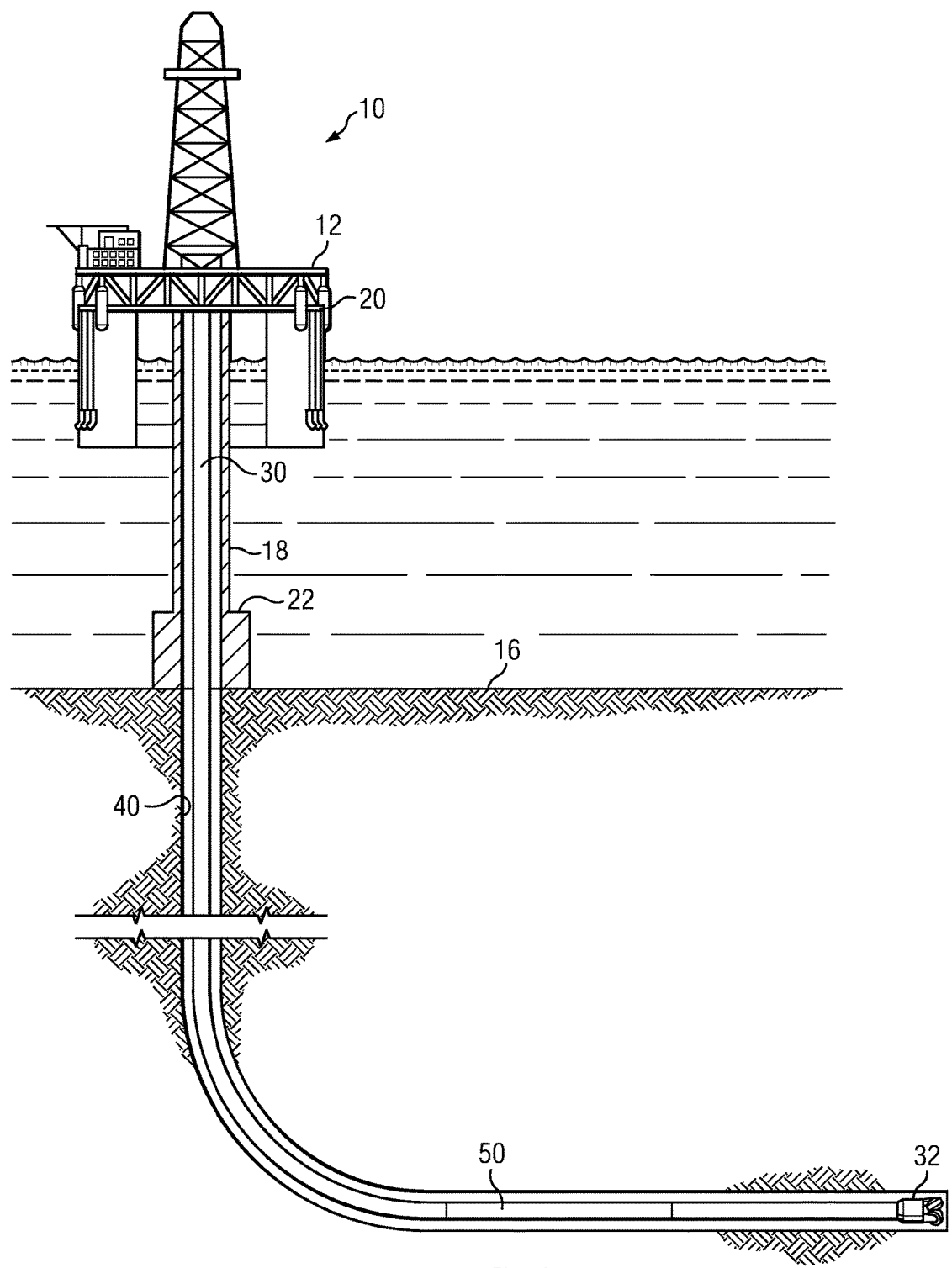
FIG. 1 depicts one example of a drilling rig on which the disclosed electromagnetic logging methods may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes an electromagnetic measurement tool 50 configured to make directional electromagnetic logging measurements. As described in more detail below the electromagnetic measurement tool 50 may include multi-axial antennas deployed on a logging while drilling tool body.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations.

FIG. 2A depicts one example of an electromagnetic measurement tool 50. In the depicted embodiment measurement tool 50 includes first and second axially spaced transmitters 52 and 54 and first and second axially spaced receivers 56 and 58 deployed on a logging while drilling tool body 51, with the receivers 56 and 58 being deployed axially between the transmitters 52 and 54. As described in more detail below, each of the transmitters 52 and 54 and receivers 56 and 58 includes at least one transverse antenna and may further include an axial antenna. For example, the transmitters and receivers may include a bi-axial antenna arrangement including an axial antenna and a transverse (cross-axial) antenna. In another embodiment, the transmitters and receivers may include a tri-axial antenna arrangement including an axial antenna and first and second transverse antennas that are orthogonal to one another. As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312 each of which is incorporated by reference herein).

FIG. 2B depicts the moments (magnetic dipoles) of one embodiment of measurement tool 50 in which the transmitters 52, 54 and receivers 56, 58 each include a tri-axial antenna arrangement. Each of the transmitters 52, 54 includes an axial transmitting antenna $T1_z$ and $T2_z$ and first and second transverse transmitting antennas $T1_x$, $T1_y$ and $T2_x$, $T2_y$. Likewise, each of the receivers 56, 58 includes an axial receiving antenna $R1_z$ and $R2_z$ and first and second transverse receiving antennas $R1_x$, $R1_y$ and $R2_x$, $R2_y$. It will be understood that the disclosed embodiments are not limited to a tri-axial antenna configuration such as that depicted on FIG. 2B.

Figure 2C:
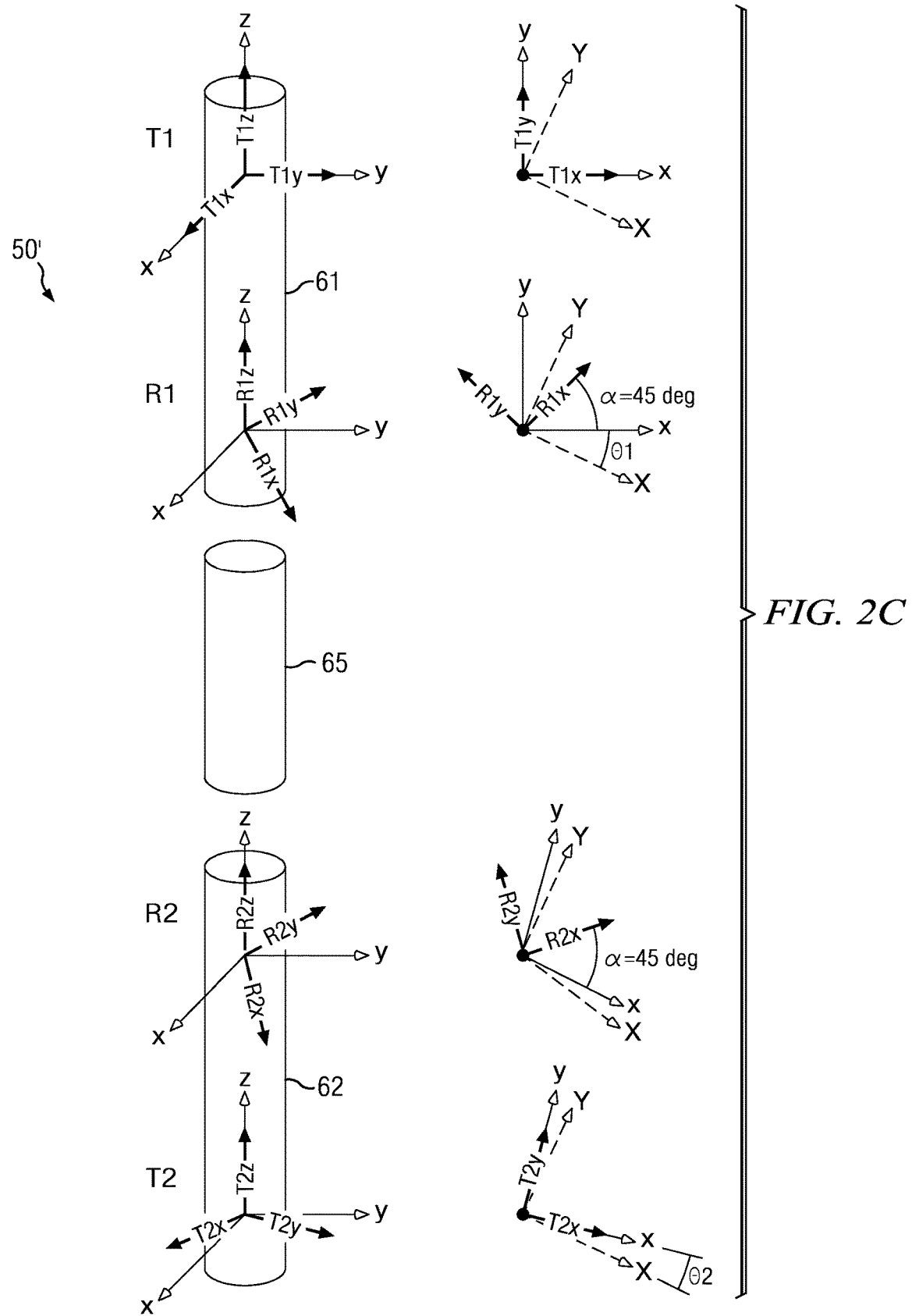
FIG. 2C schematically depicts the antenna moments in an alternative electromagnetic logging tool including triaxial transmitters and receivers.

FIG. 2C depicts an alternative electromagnetic measurement tool embodiment 50' in which the first and second transmitters are deployed on corresponding first and second subs 61 and 62 that are free to rotate with respect to one another (e.g., in an embodiment in which a drilling motor 65 is deployed therebetween). As in tool embodiment 50, each of the transmitters T1 and T2 and receivers R1 and R1 may include a tri-axial antenna arrangement. In the example embodiment depicted the moment of $R1_z$ is aligned with the moment of $T1_z$ (and the z-axis) while the moments of $R1_x$ and $R1_y$ are rotationally offset from the moments of $T1_x$ and $T1_y$ by an offset angle α (e.g., 45 degrees). The moment of $R2_z$ is aligned with the moment of $T2_z$ while the moments of $R2_x$ and $R2_y$ are rotationally offset from the moments of $T2_x$ and $T2_y$ by α (e.g., 45 degrees). The disclosed embodiments are, of course, not limited in these regards.

As stated above, the first and second subs 61 and 62 may rotate with respect to one another such that the moments of the x- and y-axis transmitting and receiving antennas are misaligned and rotate with respect to one another (i.e., the misalignment angle between the subs varies with time). Using the notation shown on FIG. 2C, at any instant in time, the orientation angle of the x-axis on sub 61 (the $T1_x$ direction) is $\theta_1$ with respect to an arbitrary 'global' (or wellbore) x-direction. Likewise, at the same instant in time, the orientation angle of the x-axis on sub 62 (the $T2_x$ direction) is $\theta_2$ with respect to the global x-direction. It will thus be understood that the moments of the x- and y-transmitting and receiving antennas T1 and T2 and R1 and R2 are misaligned by a misalignment angle $\gamma=\theta_1-\theta_2$. It will be understood that $\theta_1$ and $\theta_2$ may be referred to as toolface angles of the first and second subs in that they define the rotational orientation of the subs with respect to a global reference direction. Since $\theta_1$ and $\theta_2$ are variable with time (owing to the rotation of the subs) and since the subs rotate at different rates the misalignment angle $\gamma$ also varies with time.

Figure 3:
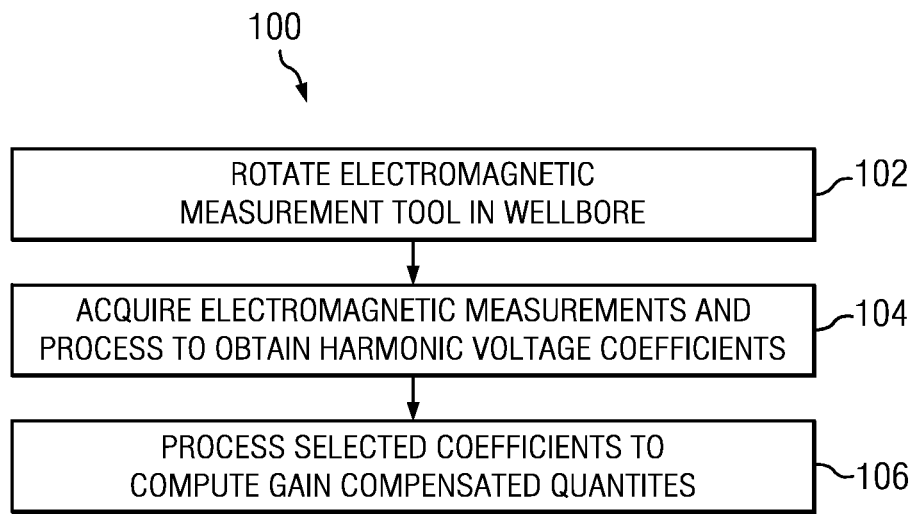
FIG. 3 depicts a flow chart of one disclosed method embodiment for obtaining gain compensated axial cross term quantities.

FIG. 3 depicts a flow chart of one disclosed method embodiment 100 for computing gain compensated cross coupling components that retain the azimuthal response characteristics of the measured cross coupling components (e.g., a gain compensated zx measurement that retains the azimuthal response of the zx coupling). An electromagnetic measurement tool (e.g., one of the measurement tools depicted on FIGS. 2B and 2C) is deployed in and rotated in a subterranean wellbore at 102 (e.g., while drilling the wellbore). Electromagnetic measurements are acquired at 104 (e.g., via firing the transmitters and receiving the corresponding electromagnetic waves at the receiving antennas) while the tool is rotating and processed to obtain harmonic voltage coefficients. Ratios of selected harmonic voltage coefficients may then be processed to obtain the gain compensated axial cross terms at 106. The harmonic voltage coefficients are selected such that (i) the transmitter and receiver gains are canceled in the computed ratio (i.e., such that the coefficients in the numerator have the same gains as the coefficients in the denominator) and such that (ii) the azimuthal response of the axial cross terms in the numerator is preserved in the gain compensated quantities. The azimuthal response may be preserved, for example, via selecting voltage coefficients for the ratio denominator that are substantially azimuthally invariant.

Figure 4:
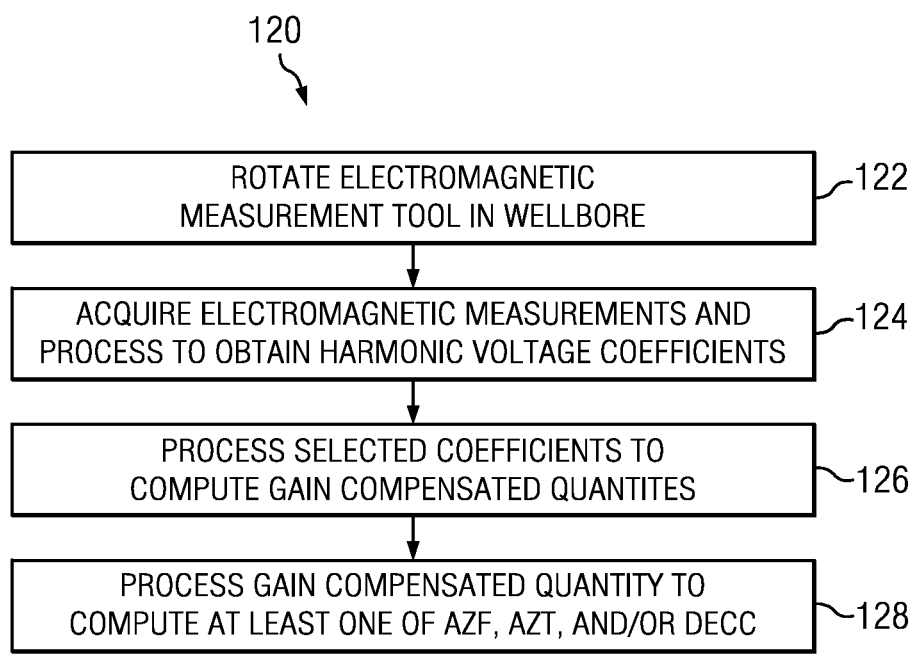
FIG. 4 depicts a flow chart of one disclosed method embodiment for computing apparent formation azimuth, tool eccentering azimuth, and tool eccentering distance.

FIG. 4 depicts a flow chart of a disclosed method embodiment 120 for computing the apparent formation azimuth, the apparent tool eccentering azimuth, and/or the tool eccentering distance from gain compensated measurements (such as gain compensated axial cross coupling components). An electromagnetic measurement tool (e.g., one of the measurement tools depicted on FIGS. 2B and 2C) is deployed in and rotated in a subterranean wellbore at 122 (e.g., while drilling). Electromagnetic measurements are acquired at 124 while the tool is rotating and processed to obtain harmonic voltage coefficients. Ratios of selected harmonic voltage coefficients may then be processed to obtain the gain compensated axial cross terms at 126 (e.g., as described above with respect to FIG. 3). One or more of the gain compensated axial cross terms is processed in 128 to compute at least one of the apparent formation azimuth, the apparent tool eccentering azimuth, and/or the tool eccentering distance.

With continued reference to FIGS. 3 and 4, and as is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennae may be processed, as is known to those of ordinary skill in the art, to obtain one or more properties of the formation.

In general, earth formations are anisotropic such that their electrical properties may be expressed as a 3×3 tensor that contains information on formation resistivity anisotropy, dip, bed boundaries and other aspects of formation geometry. It will be understood by those of ordinary skill in the art that the mutual couplings between the tri-axial transmitter antennas and the tri-axial receiver antennas depicted on FIGS. 2B and/or 2C form a 3×3 matrix and thus may have sensitivity to a full 3×3 formation impedance tensor. For example, a 3×3 matrix of measured voltages $V_{ij}$ may be expressed as follows:

$$V_{ij} = \begin{bmatrix} V_{ijxx} & V_{ijxy} & V_{ijxz} \\ V_{ijyx} & V_{ijyy} & V_{ijyz} \\ V_{ijzx} & V_{ijzy} & V_{ijzz} \end{bmatrix} = I_i Z_{ij} = \begin{bmatrix} I_{ix} & 0 & 0 \\ 0 & I_{iy} & 0 \\ 0 & 0 & I_{iz} \end{bmatrix} \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (1)$$

where $V_{ij}$ represent the 3×3 matrix of measured voltages with i indicating the corresponding transmitter triad (e.g., T1 or T2) and j indicating the corresponding receiver triad (e.g., R1 or R2), $I_i$ represent the transmitter currents, and $Z_{ij}$ represent the transfer impedances which depend on the electrical and magnetic properties of the environment surrounding the antenna pair in addition to the frequency, geometry, and spacing of the antennas. The third and fourth subscripts indicate the axial orientation of the transmitter and receiver antennas. For example, $V_{12xy}$ represents a voltage measurement on the y-axis antenna of receiver R2 from a firing of the x-axis antenna of transmitter T1.

When bending of the measurement tool is negligible (e.g., less than about 10 degrees), the measured voltages may be modeled mathematically, for example, as follows:

$$V_{ij} = G_{Ti} m_{Ti}{}^t(R_{\theta t}{}^t Z_{ij} R_{\theta r}) m_{Rj} G_{Rj} \quad (2)$$

where $Z_{ij}$ are matrices representing the triaxial tensor couplings (impedances) between the locations of transmitter i and receiver j, $G_{Ti}$ and $G_{Rj}$ are diagonal matrices representing the transmitter and receiver gains, $R_{\theta t}$ and $R_{\theta r}$ represent the rotation matrices for rotating the transmitter and receiver about the z-axis through angles $\theta_t$ and $\theta_r$, $m_{Ti}$ and $m_{Rj}$ represent the matrices of the direction cosines for the transmitter and receiver moments at $\theta=0$, and the superscript t represents the transpose of the corresponding matrix. The matrices in Equation 2 may be given, for example, as follows:

$$Z_{ij} = \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (3)$$

$$G_{Ti} = \begin{bmatrix} g_{Tix} & 0 & 0 \\ 0 & g_{Tiy} & 0 \\ 0 & 0 & g_{Tiz} \end{bmatrix} \quad (4)$$

$$G_{Rj} = \begin{bmatrix} g_{Rjx} & 0 & 0 \\ 0 & g_{Rjy} & 0 \\ 0 & 0 & g_{Rjz} \end{bmatrix} \quad (5)$$

$$R_{\theta t} = \begin{bmatrix} \cos(\theta_t) & -\sin(\theta_t) & 0 \\ \sin(\theta_t) & \cos(\theta_t) & 0 \\ 0 & 0 & 1 \end{bmatrix} \quad (6)$$

$$R_{\theta r} = \begin{bmatrix} \cos(\theta_r) & -\sin(\theta_r) & 0 \\ \sin(\theta_r) & \cos(\theta_r) & 0 \\ 0 & 0 & 1 \end{bmatrix} \quad (7)$$

Using the T1x antenna direction as a reference direction for the first sub and the T2x antenna direction as a reference direction for the second sub, the matrices of the direction cosines of the transmitter and receiver moments may be given, for example, as follows:

$$m_{T1} = I$$

$$m_{R1} = R_\alpha$$

$$m_{R2} = R_\alpha$$

$$m_{T2} = I \quad (8)$$

where I represents the identity matrix and $R_\alpha$ represents the rotation matrix about the z-axis through the angle $\alpha$. It will be understood that Equations 2-8 are written for a general embodiment (such as shown on FIG. 2C) in which the subs 61 and 62 are free to rotate with respect to one another.

In an embodiment in which the transmitters and receivers are deployed on a common tool body (such that there is no misalignment as in FIG. 2B) it will be understood that $\theta_t = \theta_r$ such that $V_{ij} = G_{Ti}(R_\theta{}^t Z_{ij} R_\theta) G_{Rj}$. It will be understood that the disclosed embodiments are not limited in regard to the relative rotation of the transmitters and receivers. Gain compensated quantities may be computed with or without relative rotation between the transmitters and receivers. For example, commonly assigned U.S. patent application Ser. No. 14/549,396 (which is fully incorporated by reference herein) discloses methods for obtaining gain compensated measurements with differential rotation of the first transmitter and receiver with respect to the second transmitter and receiver (e.g., in an embodiment similar to that depicted on FIG. 2C). Commonly assigned U.S. patent application Ser. No. 14/325,797 (which is also fully incorporated by reference herein) discloses methods for obtaining compensated measurements in which the transmitters and receivers are rotationally fixed relative to one another (e.g., in an embodiment similar to that depicted on FIG. 2B).

In embodiments in which the transmitters and receivers are rotationally fixed, the rotated couplings may be expressed mathematically in harmonic form, for example, as follows:

$$R_\theta^t Z_{ij} R_\theta = Z_{DC\_ij} + Z_{FHC\_ij} \cos(\theta) + Z_{FHS\_ij} \sin(\theta) + Z_{SHC\_ij} \cos(2\theta) + Z_{SHS\_ij} \sin(2\theta) \quad (9)$$

where $Z_{DC\_ij}$ represents a DC (average) coupling coefficient, $Z_{FHC\_ij}$ and $Z_{FHS\_ij}$ represent first order harmonic cosine and first order harmonic sine coefficients, and $Z_{SHC\_ij}$ and $Z_{SHS\_ij}$ represent second order harmonic cosine and second order harmonic sine coefficients of the ij transmitter receiver couplings. These coefficients are shown below:

$$Z_{DC\_ij} = \begin{bmatrix} \frac{Z_{ijxx} + Z_{ijyy}}{2} & \frac{(Z_{ijxy} - Z_{ijyx})}{2} & 0 \\ -\frac{(Z_{ijxy} - Z_{ijyx})}{2} & \frac{Z_{ijxx} + Z_{ijyy}}{2} & 0 \\ 0 & 0 & Z_{ijzz} \end{bmatrix} \quad (10)$$

$$Z_{FHC\_ij} = \begin{bmatrix} 0 & 0 & Z_{ijxz} \\ 0 & 0 & Z_{ijyz} \\ Z_{ijzx} & Z_{ijzy} & 0 \end{bmatrix}$$

$$Z_{FHS\_ij} = \begin{bmatrix} 0 & 0 & Z_{ijyz} \\ 0 & 0 & -Z_{ijxz} \\ Z_{ijzy} & Z_{ijzx} & 0 \end{bmatrix}$$

$$Z_{SHC\_ij} = \begin{bmatrix} \frac{Z_{ijxx} - Z_{ijyy}}{2} & \frac{(Z_{ijxy} + Z_{ijyx})}{2} & 0 \\ \frac{(Z_{ijxy} + Z_{ijyx})}{2} & -\frac{(Z_{ijxx} - Z_{ijyy})}{2} & 0 \\ 0 & 0 & 0 \end{bmatrix}$$

$$Z_{SHS_{ij}} = \begin{bmatrix} \frac{(Z_{ijxy} + Z_{ijyx})}{2} & -\frac{(Z_{ijxx} - Z_{ijyy})}{2} & 0 \\ -\frac{(Z_{ijxx} - Z_{ijyy})}{2} & -\frac{(Z_{ijxy} + Z_{ijyx})}{2} & 0 \\ 0 & 0 & 1 \end{bmatrix}$$

In general, the receiving antenna voltages are measured while the tool rotates in the borehole. Following the form of Equation 9, the measured voltages may be expressed mathematically in terms of their harmonic voltage coefficients, for example, as follows thereby enabling the harmonic voltage coefficients to be obtained:

$$V_{ij} = V_{DC\_ij} \cos(\theta) + V_{FHS\_ij} \sin(\theta) + V_{SHC\_ij} \cos(2\theta) + V_{SHS\_ij} \sin(2\theta) \quad (11)$$

wherein where $V_{DC\_ij}$ represents a DC voltage coefficient, $V_{FHC\_ij}$ and $V_{FHS\_ij}$ represent first order harmonic cosine and first order harmonic sine voltage coefficients (also referred to herein as first harmonic cosine and first harmonic sine voltage coefficients), and $V_{SHC\_ij}$ and $V_{SHS\_ij}$ represent second order harmonic cosine and second order harmonic sine voltage coefficients (also referred to herein as second harmonic cosine and second harmonic sine voltage coefficients) of the ij transmitter receiver couplings.

It will be understood that collocated tri-axial transmitter and receiver embodiments (e.g., as depicted on FIGS. 2B and 2C) are not required to gain compensate certain of the 3×3 matrix components. For example, the axial cross terms (i.e., the xz, zx, yz, and zy terms) may be gain compensated using any tool embodiment that includes an axial transmitter antenna, a transverse (cross-axial) transmitter antenna, an axial receiver antenna, and a transverse receiver antenna deployed on the tool body. These transmitter and receiver antennas may be distributed along the tool body with substantially any suitable spacing and order. Moreover, the transmitter antennas and/or the receiver antennas may be collocated (or not). The disclosed embodiments are not limited to any particular transmitter and receiver antenna configuration so long as the tool includes at least one axial transmitter antenna, at least one transverse transmitter antenna, at least one axial receiver antenna, and at least one transverse receiver antenna.

The measured voltages may be related to the impedances between the transmitter and receiver antennas as described above. The DC, first harmonic cosine, and first harmonic sine voltage coefficients may be expressed, for example, as follows in terms of the couplings and the respective transmitter and receiver gains:

$$V_{DC\_xx} = g_{Tx} g_{Rx} \frac{Z_{xx} + Z_{yy}}{2} \quad (12)$$

$$V_{DC\_zz} = g_{Tz} g_{Rz} Z_{zz}$$

$$V_{FHC\_xz} = g_{Tx} g_{Rz} Z_{xz}$$

$$V_{FHC\_zx} = g_{Tz} g_{Rx} Z_{zx}$$

$$V_{FHS\_xz} = g_{Tx} g_{Rz} Z_{yz}$$

$$V_{FHS\_zx} = g_{Tz} g_{Rx} Z_{zy}$$

where $g_{Tz}$ and $g_{Tx}$ represent the gains of the axial and transverse transmitter antennas, $g_{Rz}$ and $g_{Rx}$ represent the gains of the axial and transverse receiver antennas, $V_{DC\_xx}$ is the DC voltage obtained from the x directed receiver when the x directed transmitter fires, $V_{DC\_zz}$ is the DC voltage obtained from the z directed receiver when the z directed transmitter fires, $V_{FHC\_xz}$ ($V_{FHS\_xz}$) is the first harmonic cosine (sine) voltage obtained from the z directed receiver when the x directed transmitter fires, and $V_{FHC\_zx}$ ($V_{FHS\_zx}$) is the first harmonic cosine (sine) voltage obtained from the x directed receiver when the z directed transmitter fires. Similar coefficients may be expressed for the y-axis transmitter and receiver couplings when employed.

With reference again to FIG. 3, ratios of selected harmonic voltage coefficients may be computed to obtain the gain compensated cross coupling measurement quantities. In order to obtain a gain compensated quantity in which the azimuthal response is preserved, three conditions may be met. First, the numerator of the ratios may include at least one harmonic voltage coefficients related to the cross coupling of interest. For example, to compute a compensated zx cross coupling, the numerator may include at least one zx harmonic voltage coefficient. Second, the harmonic voltage coefficients may be selected such that the transmitter and receiver gains are fully canceled in the computed ratio. Thus the harmonic voltages may be selected such that identical transmitter and receiver gains are present in the numerator and the denominator. And third, in order to preserve the azimuthal response of the cross coupling, the harmonic voltage coefficients in the denominator may be selected such that they are substantially azimuthally invariant (i.e., independent of the azimuth angle).

For example, a fully gain compensated quantity CZX having the characteristics of a zx tensor coupling may be computed according to the previous three criteria as follows:

$$CZX = \sqrt{\frac{V_{FHC\_12zx} \cdot V_{FHC\_21xz}}{V_{DC\_22xx} \cdot V_{DC\_11zz}}}, \text{ or} \quad (13)$$

-continued $$CZX = \sqrt{\frac{V_{FHS\_12zy} \cdot V_{FHS\_21yz}}{V_{DC\_22yy} \cdot V_{DC\_11zz}}}$$

Likewise a fully gain compensated quantity CZY having the characteristics of a zy tensor coupling may be computed according to the previous three criteria as follows:

$$CZY = \sqrt{\frac{V_{FHS\_12zx} \cdot V_{FHS\_21xz}}{V_{DC\_22xx} \cdot V_{DC\_11zz}}}, \text{ or}$$

$$CZY = \sqrt{\frac{V_{FHC\_12zy} \cdot V_{FHC\_21yz}}{V_{DC\_22yy} \cdot V_{DC\_11zz}}}$$
(14)

A gain compensated quantity CXZ having the characteristics of a xz tensor coupling element may be computed according to the previous three criteria as follows:

$$CXZ = \sqrt{\frac{V_{FHC\_21zx} \cdot V_{FHC\_12xz}}{V_{DC\_11xx} \cdot V_{DC\_22zz}}}, \text{ or}$$

$$CXZ = \sqrt{\frac{V_{FHS\_21zy} \cdot V_{FHS\_12yz}}{V_{DC\_11yy} \cdot V_{DC\_22zz}}}$$
(15)

And a gain compensated quantity CYZ having the characteristics of a yz tensor coupling element may be computed according to the previous three criteria as follows:

$$CYZ = \sqrt{\frac{V_{FHS\_21zx} \cdot V_{FHS\_12xz}}{V_{DC\_11xx} \cdot V_{DC\_22zz}}}, \text{ or}$$

$$CYZ = \sqrt{\frac{V_{FHC\_21zy} \cdot V_{FHC\_12yz}}{V_{DC\_11yy} \cdot V_{DC\_22zz}}}$$
(16)

The gain compensated quantities shown in Equations 13-16 meet the above described three conditions as follows: (i) each quantity includes at least one harmonic voltage coefficient related to the coupling of interest, (ii) the numerators and denominators in each equation include identical transmitter and receiver gains, and (iii) the denominator in each equation is substantially azimuthally invariant (e.g., including only DC coefficients).

The gain compensated quantities computed in Equations 13-16 may be further processed to compute gain compensated symmetrized (SX and SY) and anti-symmetrized measurement quantities (AX and AY), for example, as follows:

$SX=CZX-CXZ$ $AX=CZX+CXZ$ $SY=CZY-CYZ$ $AY=CZY+CYZ$ (17)

Figure 5A:
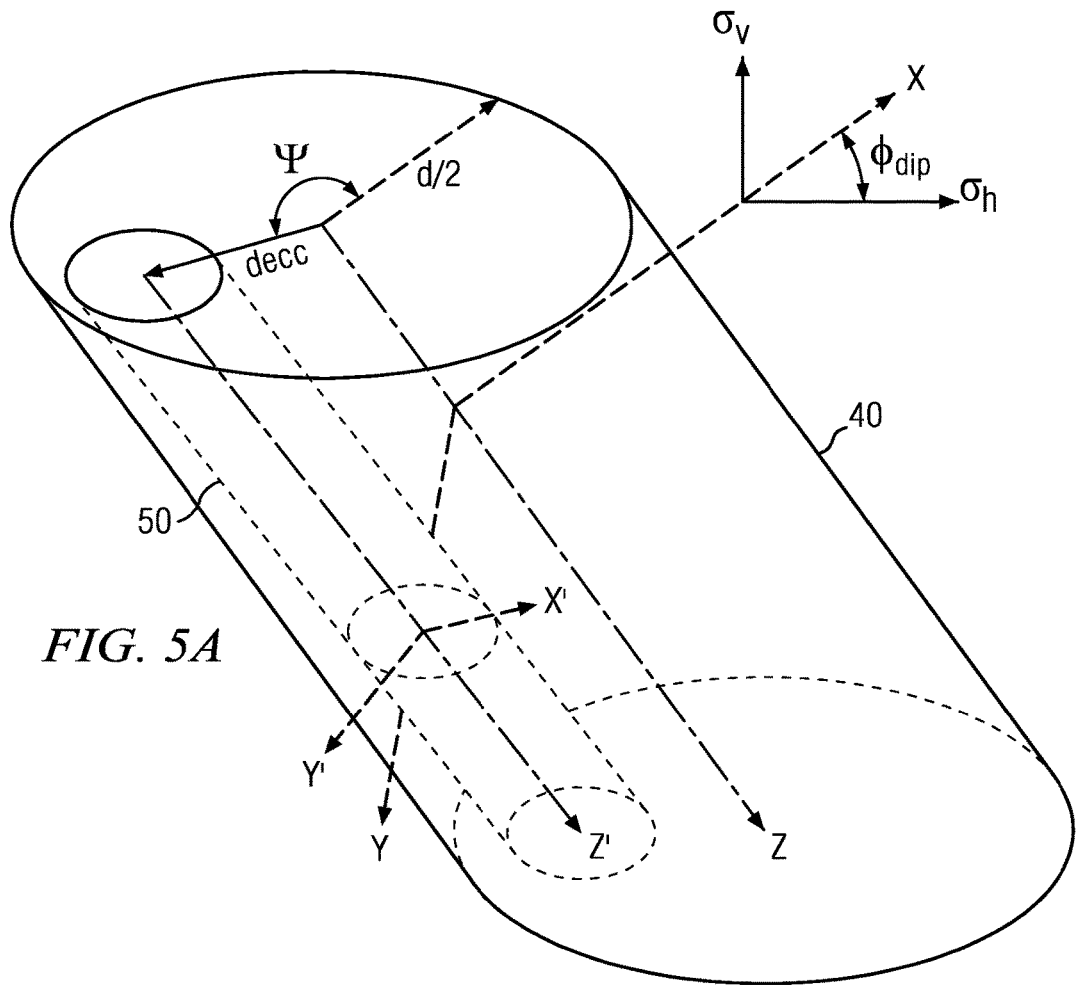
FIGS. 5A and 5B depict a schematic illustration of an eccentered tool in a wellbore that penetrates an anisotropic formation at a relative dip angle.
Figure 5B:
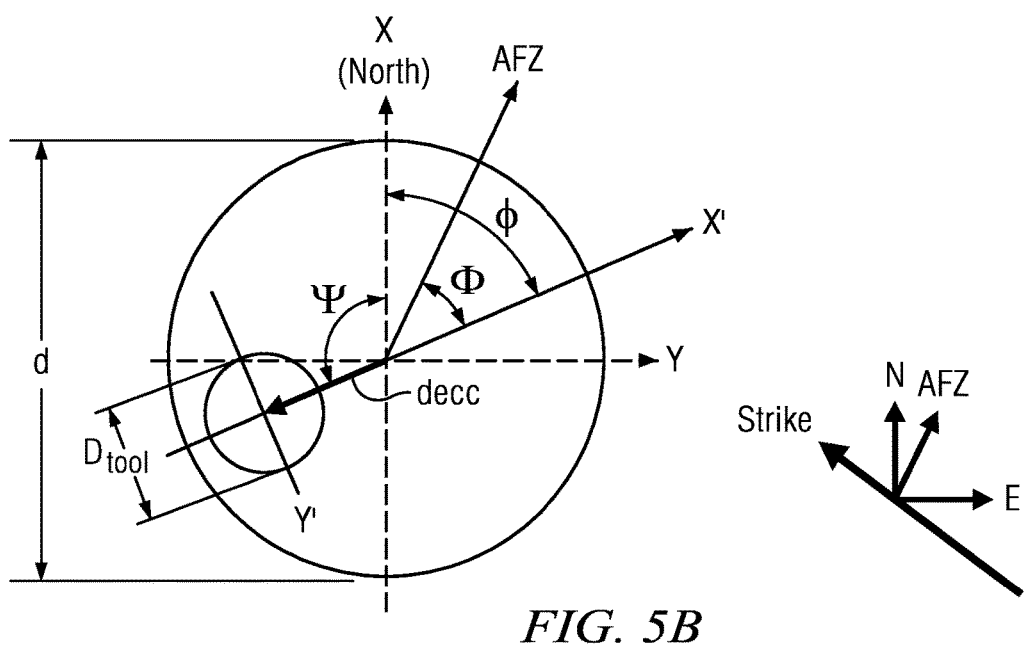

Turning now to FIGS. 5A and 5B, a schematic illustration of an eccentered electromagnetic logging tool 50 deployed in a wellbore 40 that penetrates an anisotropic formation at a relative dip angle is shown. A wellbore reference frame may be defined by x-, y-, and z-axes (which are fixed relative to the wellbore). A tool reference frame may be defined by x'-, y'-, and z'-axes which are fixed relative to the logging tool. Rotation of the tool in the wellbore causes the x'- and y'-tool axes rotate about the z- and z'-axes with respect to the x- and y-axes of the wellbore. The relative angle between the reference frames (e.g., between the x- and x'-axes in the plane orthogonal to the z-axis) is commonly referred to in the art as the toolface angle.

The tool 50 is shown to be eccentered in the wellbore 40 (having a wellbore diameter d) by an eccentering distance decc at an eccentering azimuthal angle ψ (in the wellbore reference frame). An apparent eccentering azimuth (also referred to as the apparent tool eccentering angle AZT) may be defined as the direction of tool eccentering in the tool reference frame (e.g., with respect to the x'-axis). The formation is depicted to be anisotropic, having vertical and horizontal conductivities σv and σh at a relative dip angle $\phi_{dip}$ with respect to the x-axis (i.e., with respect to the wellbore reference frame). An apparent dip azimuth angle is indicated by Φ and represents the relative angle between an orientation marker on the tool (e.g., the x'-axis on the tool which is aligned with the magnetic dipole on the x-axis transmitter) and the direction of the formation's normal vector on the plane orthogonal to the tool's z'-axis. The apparent dip azimuth angle is also referred to herein as the apparent formation azimuth AZF. The conductivity of the drilling fluid is also indicated by σmud.

Finite element mathematical modeling results indicate, that for this simple wellbore model of a layered anisotropic formation traversed obliquely by a wellbore, the trans-impedance coupling voltage response $V_{ij}$ (e.g., give in Equations 1 and 11) depends on the above described parameters in a highly complicated manner. Owing to the large number of parameters (and the complicated effect of these parameters on the measured voltage $V_{ij}$), performing a robust and reliable inversion for the borehole and formation parameters is particularly difficult and problematic.

One aspect of the disclosed embodiments is the realization that of the above described multiple parameters, the response of the relative dip angle $\phi_{dip}$ and the eccentering azimuthal angle ψ (or equivalently, in the tool reference frame, the apparent formation azimuth AZF and the apparent tool eccentering angle AZT) can be decoupled from the remaining parameters and computed directly from the above described gain compensated measurement quantities. Moreover, the eccentering distance decc may also be estimated from the gain compensated measurement quantities. As a result, the complexity of the inversion for the remaining parameters may be greatly simplified.

With reference again to FIG. 4, it has been found that the apparent formation azimuth AZF and the apparent tool eccentering azimuth AZT can be directly computed from the gain compensated xz and yz related off-diagonal components of the induction measurements (i.e., via a mathematical equation having a closed form solution). For example, the gain compensated symmetrized and anti-symmetrized measurement quantities given above in Equation 17 can be processed at 128 to compute the apparent formation azimuth AZF and the apparent tool eccentering azimuth AZT as given below in Equations 18 and 19:

$$AZF = \text{Mod}\left(-\text{atan2}(\text{imag}(AY), \text{imag}(AX)) \cdot \frac{180}{\pi}, 360\right) \quad (18)$$

$$AZT = \text{Mod}\left(-\text{atan2}(\text{imag}(SY), \text{imag}(SX)) \cdot \frac{180}{\pi}, 360\right) \quad (19)$$

where Mod(a, m) represents the modulo operation (sometimes referred to in the mathematics arts as the modulus operation) that returns the remainder after the division of a by m (where a is the dividend and m is the divisor), a tan 2 (Y, X) represents the four quadrant inverse tangent function of Y and X, and imag(x) represents the imaginary part of the argument x. In particular with respect to Equations 18 and 19, the modulo operation returns the remainder when the dividend (the four quadrant inverse tangent function) is divided by 360.

The eccentering distance decc may also be computed from the gain compensated symmetrized measurement quantities, for example, as follows:

$$decc = decc_m \cdot \left(\frac{\text{imag}(SX)}{\text{imag}(SX_m)}\right) \quad (20)$$

$$decc = decc_m \cdot \left(\frac{\text{imag}(SY)}{\text{imag}(SY_m)}\right)$$

where $decc_m$ represents the maximum eccentering distance for a given bit size BS and tool diameter $D_{tool}$ such that $decc_m = (BS - D_{tool})/2$, and $SX_m$ and $SY_m$ represent modeled values for SX and SY when $decc = decc_m$. The eccentering distance decc is preferably (but not necessarily) computed when AZT=0.

It will be understood that computing the apparent formation azimuth AZF, the apparent tool eccentering azimuth AZT, and the tool eccentering distance decc as described above greatly simplifies the subsequent inversion. For example, in the model described above with respect to FIGS. 5A and 5B, the gain compensated measurement quantities, AZF, AZT, and decc may subsequently be used to invert for the remaining parameters (e.g., including the horizontal and vertical formation resistivity).

Model Data Validation

The disclosed embodiments are now described in further detail by way of the following non-limiting computational examples. A finite element code was used to model the responses of the example triaxial tool depicted on FIG. 2B deployed in a wellbore traversing a dipping anisotropic formation such as that illustrated in FIGS. 5A and 5B. The transmitter-to-receiver spacing (between T1 and R1 and between T2 and R2) was 34 inches. The spacing between R1 and R2 was 18 inches. The outer diameter of the tool was 8.5 inches and the borehole diameter was 14 inches. The horizontal resistivity and the vertical resistivity of the anisotropic formation were Rh=1 ohm·m and Rv=S ohm·m (it will be understood to those of ordinary skill in the art that conductivity and resistivity are reciprocally related and can be derived from one another). The wellbore was filled with an oil-based drilling fluid having a resistivity of 1000 ohm·m. The formation dip was 30 degrees and the apparent dip azimuth was incremented from 0 to 330 degrees in 30 degree steps for a total of 12 formation iterations. For each formation iteration, the tool was deployed at an eccentering distance decc off center in the borehole with the apparent tool eccentering azimuth varying from 0 to 330 degrees in 30 degree increments for a total of 12 tool eccentering azimuth iterations. Thus for a given tool eccentering distance, a set of 144 iterations were generated (12 dip azimuth iterations times 12 eccentering azimuth iterations). Multiple sets of iterations were computed for corresponding tool eccentering distances ranging from 0 to 2 inches.

The apparent formation azimuth and the apparent tool eccentering azimuth were estimated from the off-diagonal components of two-coil induction measurements from transmitter station i and receiver station j, Zijkl, using the following equations (similar to Equations 18 and 19):

$$AZF = \quad (21)$$
$$\text{Mod}\left(-\text{atan2}(\text{imag}(Zijzy + Zijyz), \text{imag}(Zijzx + Zijxyz)) \cdot \frac{180}{\pi}, 360\right)$$

$$AZT = \quad (22)$$
$$\text{Mod}\left(-\text{atan2}(\text{imag}(Zijzy - Zijyz), \text{imag}(Zijzx - Zijxyz)) \cdot \frac{180}{\pi}, 360\right)$$

where Zijzy+Zijyz and Zijzx+Zijxyz represent anti-symmetrized y-axis and x-axis measurement quantities and Zijzy−Zijyz and Zijzx−Zijxyz represent symmetrized y-axis and x-axis measurement quantities.

Figure 6A:
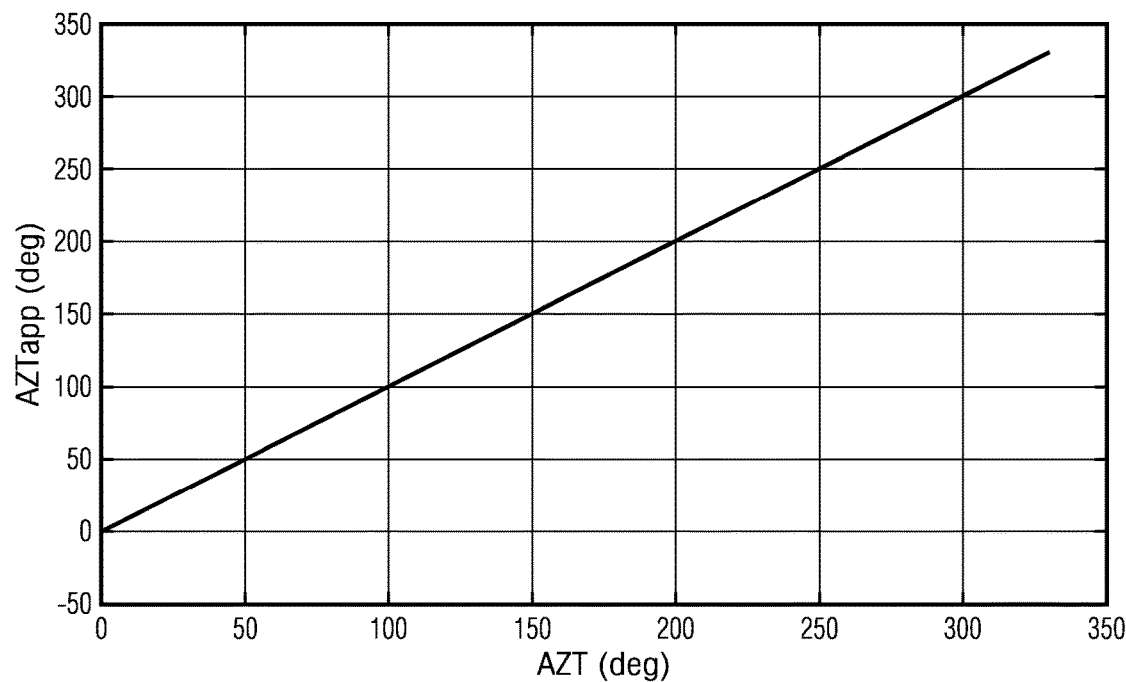
FIGS. 6A and 6B depict plots of the apparent formation dip azimuth versus the modeled formation dip azimuth (6A) and the apparent tool eccentering azimuth versus the modeled tool eccentering azimuth (6B).
Figure 6B:
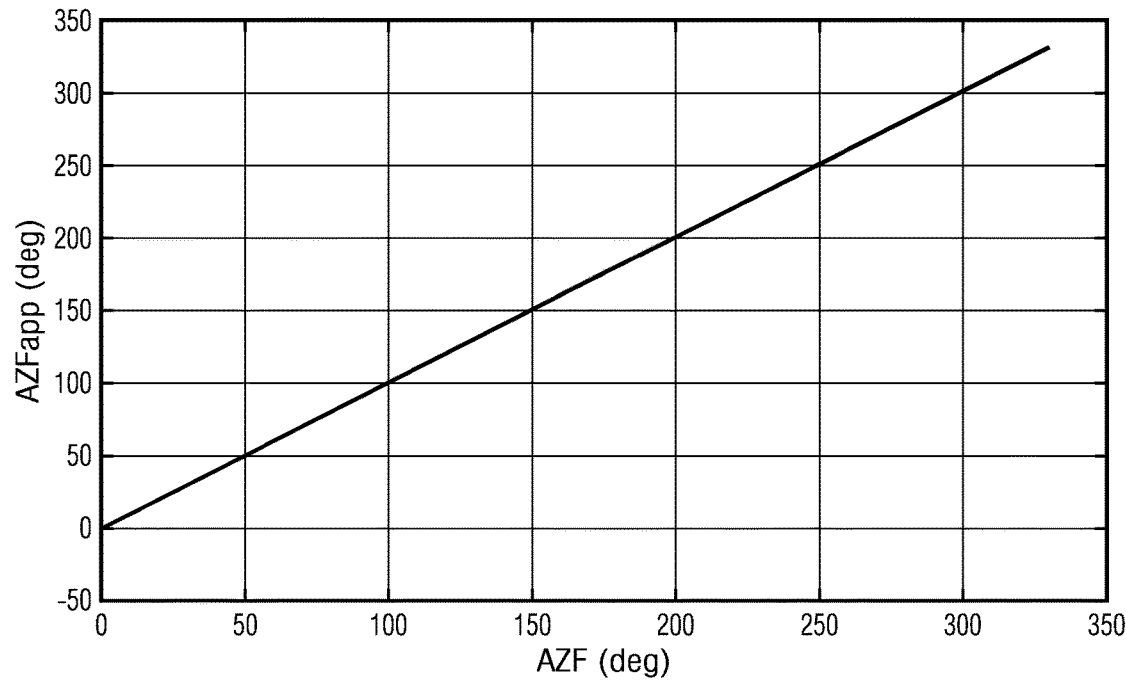

FIG. 6A depicts a plot of the apparent formation dip azimuth computed using Equation 21 versus the modeled formation dip azimuth for each of the 12 iterations of tool eccentering azimuth and FIG. 6B depicts a plot of the apparent tool eccentering azimuth computed using Equation 22 versus the modeled tool eccentering azimuth for each of the 12 iterations of formation dip azimuth at an eccentering distance of 2 inches. Note that for this example Equations 21 and 22 reproduce the modeled values perfectly with the 12 iterations overlaying one another (such that it appears that each figure includes only a single plot).

With further reference to FIGS. 6A and 6B, it should be noted that for practical tool embodiments deployed in realistic downhole environments, achieving perfect transmitter and receiver gain matching would be extremely challenging and expensive. Moreover failing to match these gains results in significant errors.

Figure 7A:
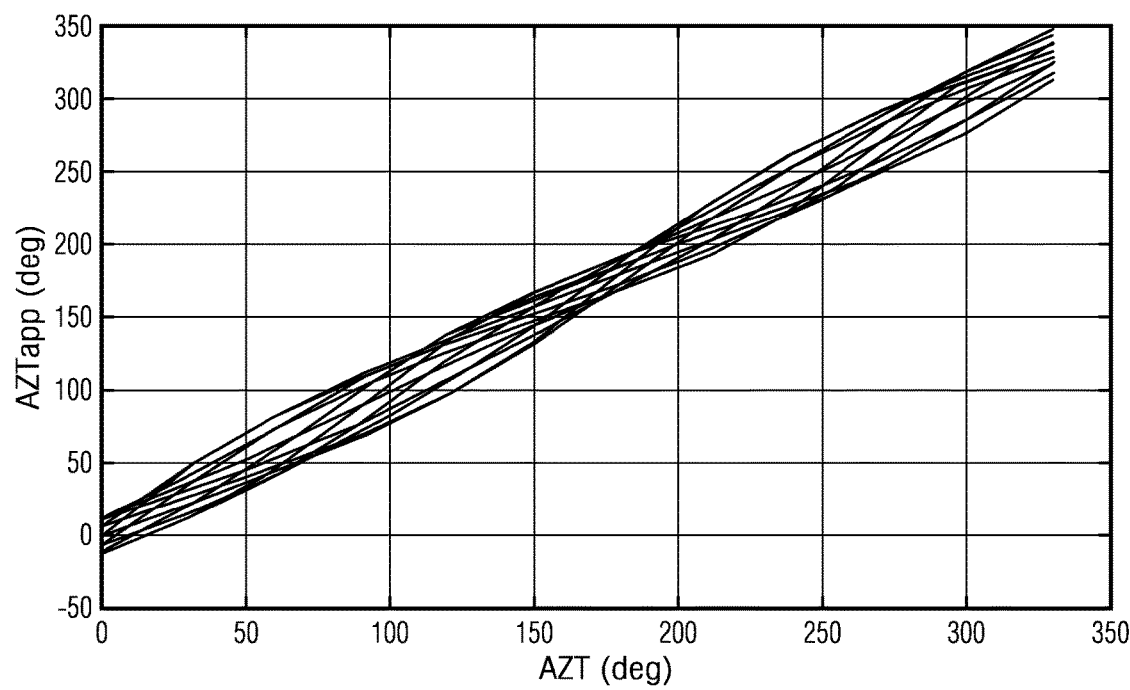
FIGS. 7A and 7B depict plots similar to those shown on FIGS. 6A and 6B, for an example in which a uniformly distributed random gain was introduced for each transmitter and receiver.
Figure 7B:
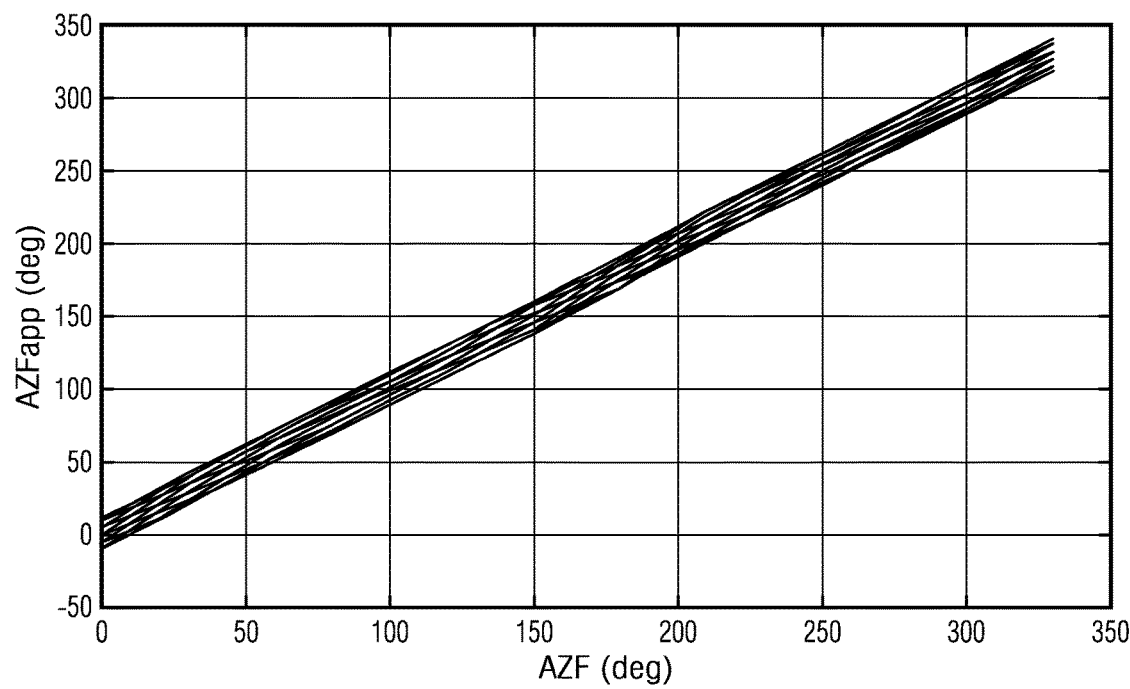
Figure 8A:
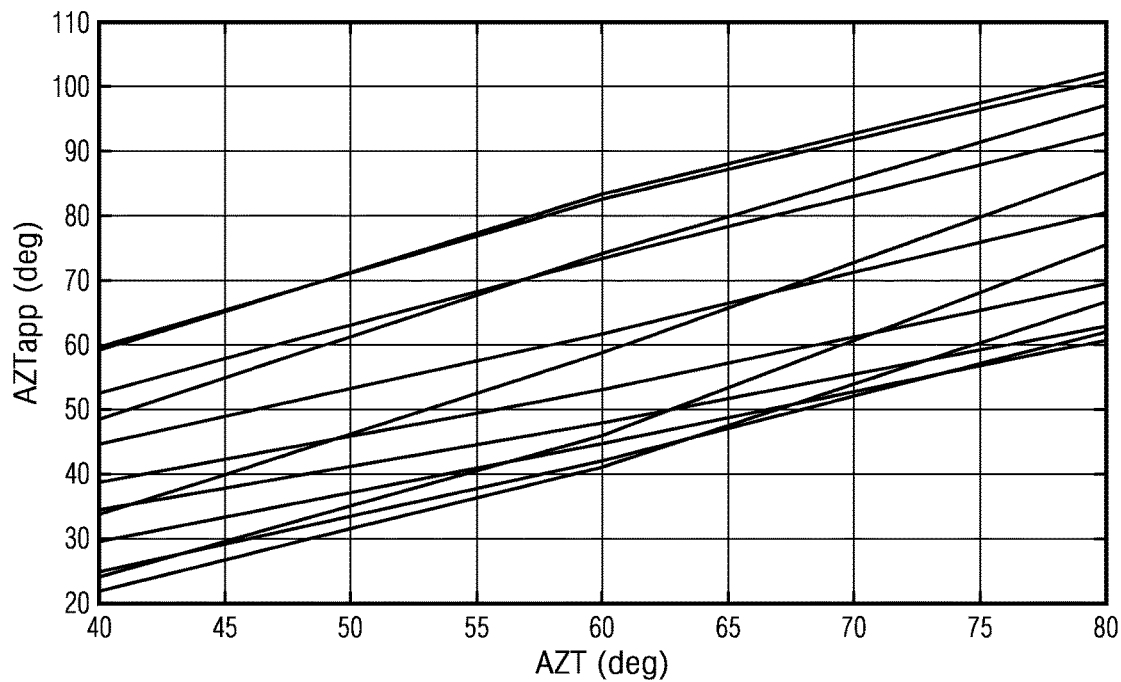
FIGS. 8A and 8B depict the same data as in FIGS. 7A and 7B plotted over a range of 40 to 80 degrees on the horizontal axis.
Figure 8B:
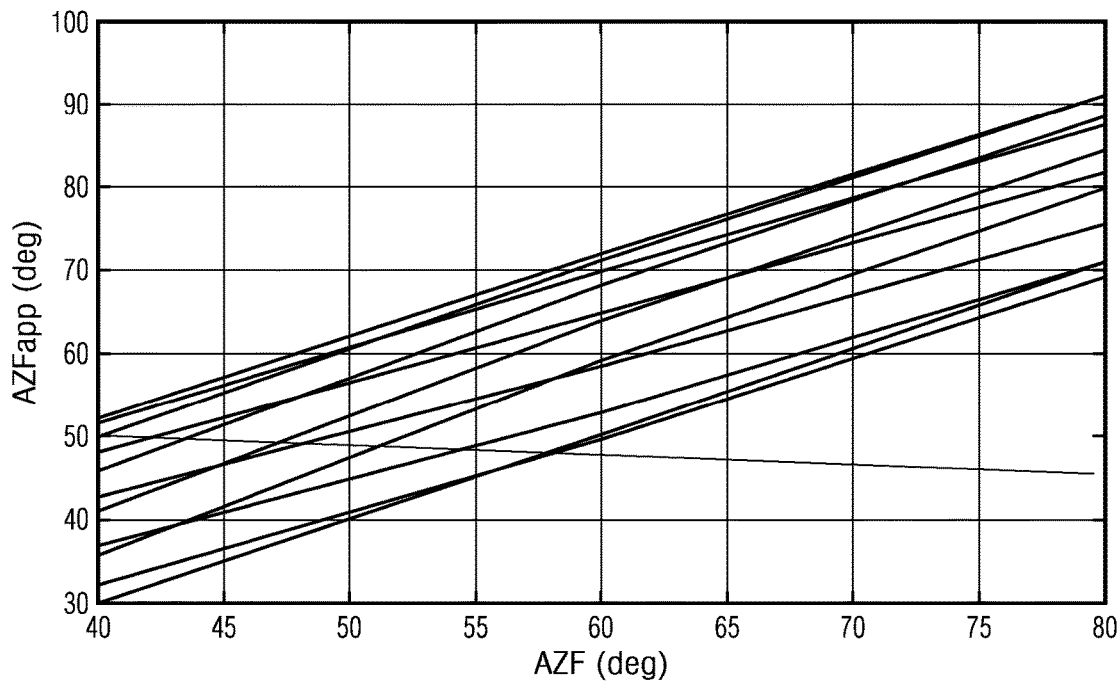

FIGS. 7A and 7B depict plots similar to those shown on FIGS. 6A and 6B, for an example in which a uniformly distributed random gain was introduced for each transmitter and receiver. In this example the amplitude gain varied by +/−10 percent and the phase varied by +/−30 degrees between the transmitters and receivers (instead of assuming an amplitude gain of unity having zero phase as in example plotted in FIGS. 6A and 6B). As depicted, the computed apparent formation azimuth and the apparent tool eccentering azimuth were scattered (due to the gain mismatches) in a large band about the modeled values. FIGS. 8A and 8B depict the same data plotted over a range of 40 to 80 degrees on the horizontal axis. Based on FIGS. 8A and 8B, the gain mismatch causes an uncertainty in the apparent formation azimuth of +/−22 degrees and an uncertainty in the apparent tool eccentering azimuth of +/−12 degrees. Such uncertainties significantly reduce the usefulness of the apparent formation azimuth and apparent tool eccentering azimuth computations using uncompensated measurement quantities.

As described above with respect to Equations 12-17, fully gain compensated measurements quantities may be obtained by computing ratios of various harmonic coefficients of the voltage measurements. Moreover, the azimuthal response of these quantities may be preserved by ensuring that the divisor (the denominator) of the ratios is substantially azimuthally invariant. FIGS. 9A and 9B, 10A and 10B, and 11A and 11B demonstrate that the denominator is substantially azimuthally invariant (e.g., within a few percent) for the quantity CZX (the denominator in Equation 13 is given as $V_{DC\_22}xx \cdot V_{DC\_11}zz$). The wellbore and formation were assumed to be identical to those described above for the examples depicted on FIGS. 6A and 6B, 7A and 7B, and 8A and 8B. The tool eccentering distance was taken to be 2 inches.

Figure 9A:
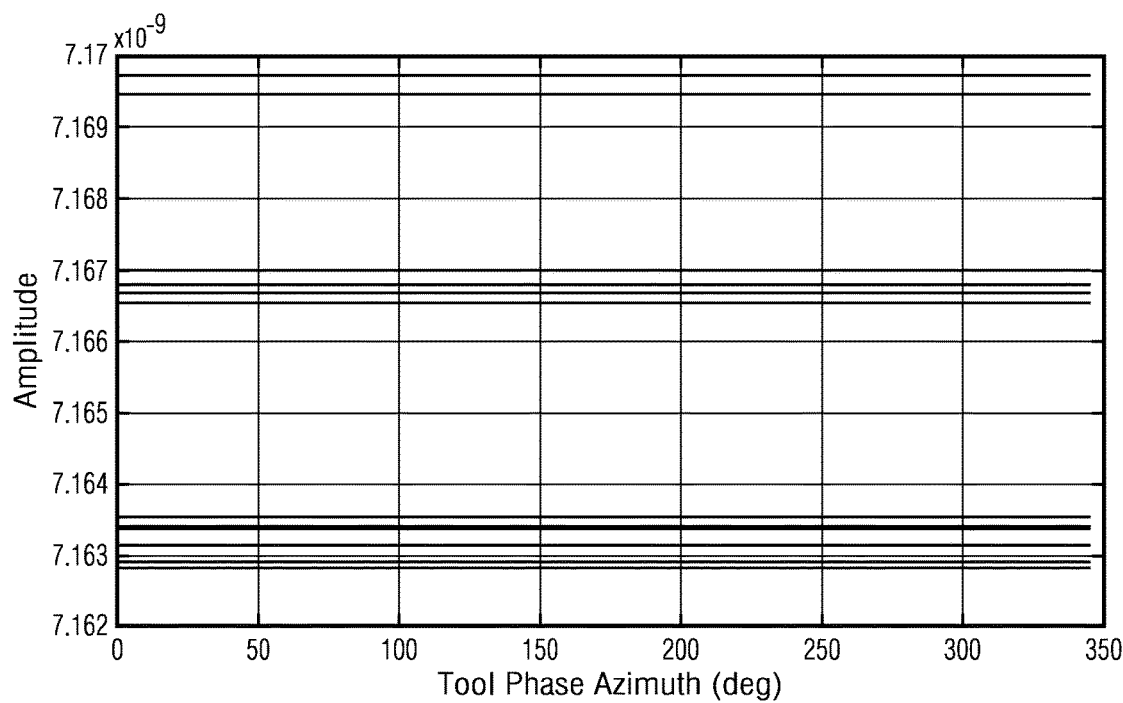
FIGS. 9A and 9B depict plots of the amplitude (9A) and phase (9B) of $V_{DC\_22}xx \cdot V_{DC\_11}zz$ versus toolface angle at an apparent tool eccentering azimuth of 0 degrees.
Figure 9B:
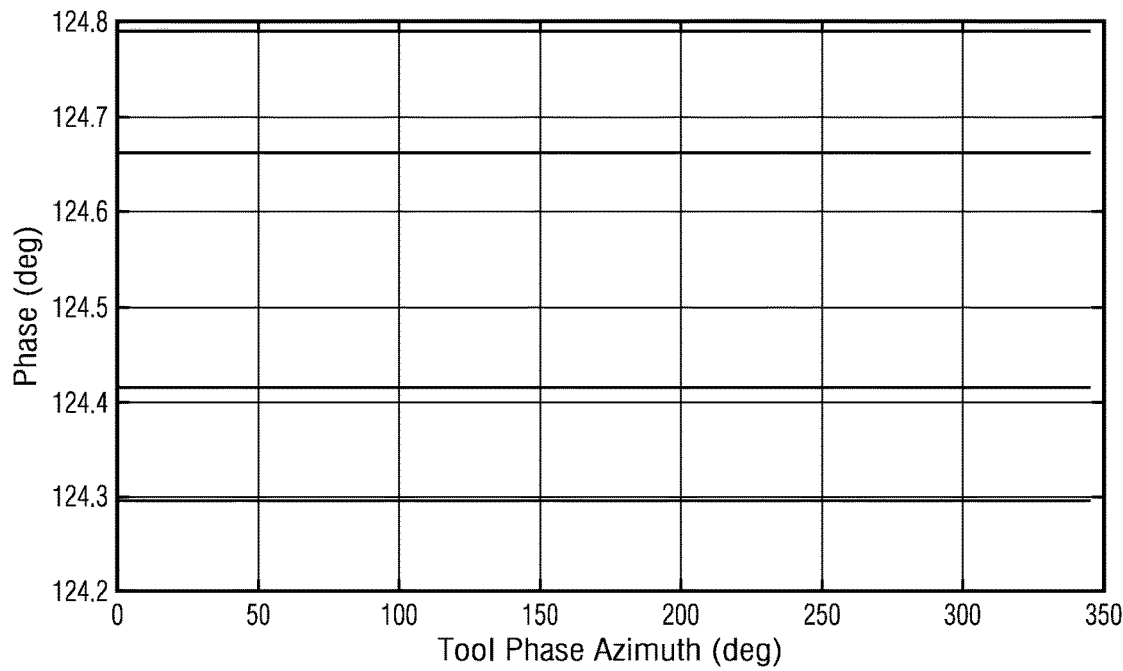

FIGS. 9A and 9B depict plots of the amplitude (9A) and phase (9B) of $V_{DC\_22}xx \cdot V_{DC\_11}zz$ versus toolface angle for the above described formation dip azimuth iterations at a tool eccentering azimuth of 0 degrees. The quantity $V_{DC\_22}xx \cdot V_{DC\_11}zz$ is clearly azimuthally invariant as indicated by the horizontal curves (lines).

Figure 10A:
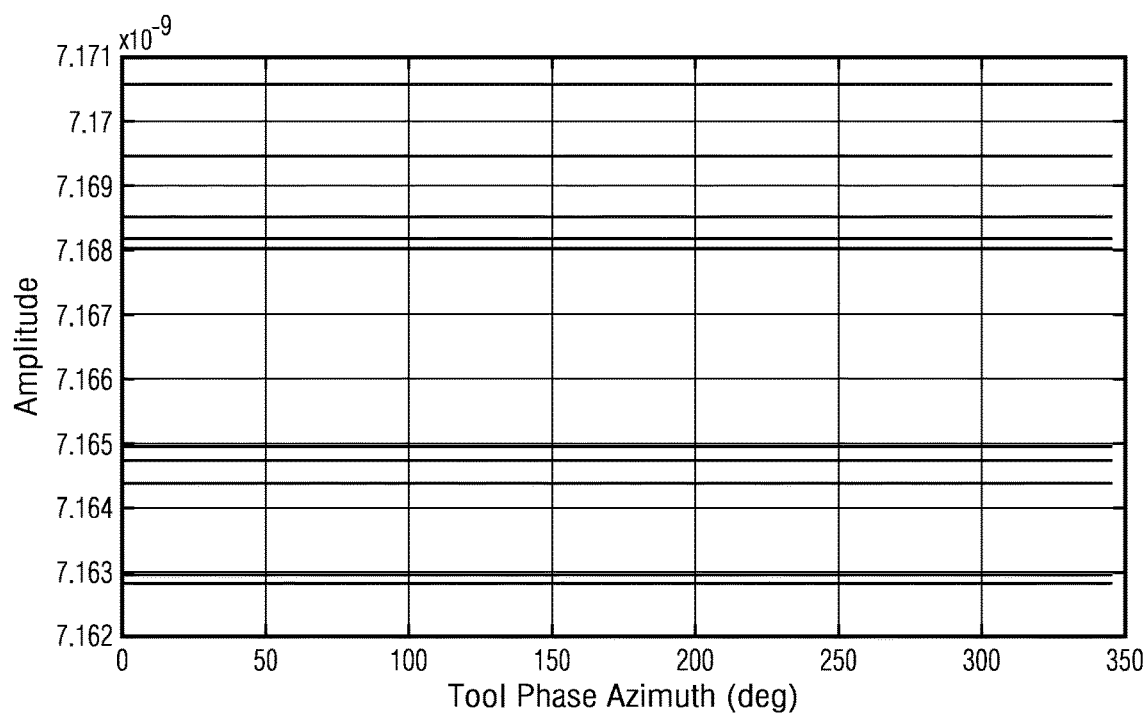
FIGS. 10A and 10B depict plots of the amplitude (10A) and phase (10B) of $V_{DC\_22}xx \cdot V_{DC\_11}zz$ versus toolface angle at an apparent formation azimuth of 0 degrees.
Figure 10B:
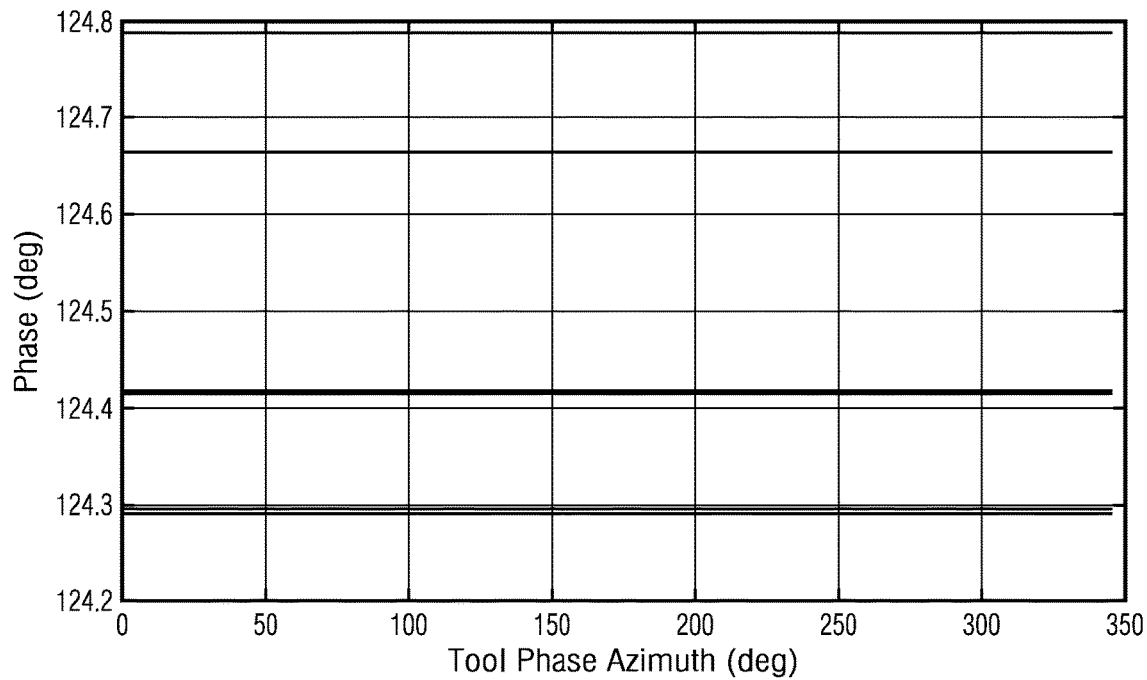

FIGS. 10A and 10B depict plots of the amplitude (10A) and phase (10B) of $V_{DC\_22}xx \cdot V_{DC\_11}zz$ versus toolface angle for the above described tool eccentering azimuth iterations at a formation dip azimuth of 0 degrees. The quantity $V_{DC\_22}xx \cdot V_{DC\_11}zz$ is clearly azimuthally invariant as indicated by the horizontal curves (lines).

Figure 11A:
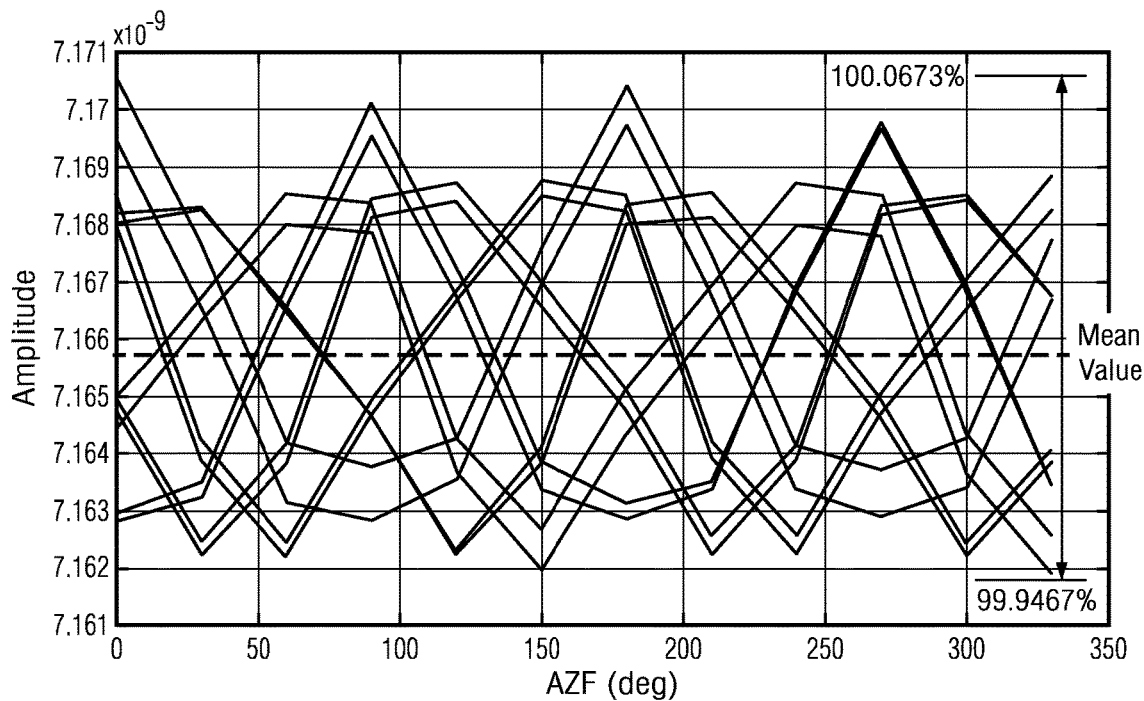
FIGS. 11A and 11B depict plots of the amplitude (11A) and phase (11B) of $V_{DC\_22}xx \cdot V_{DC\_11}zz$ versus apparent formation azimuth at a toolface angle of zero degrees.
Figure 11B:
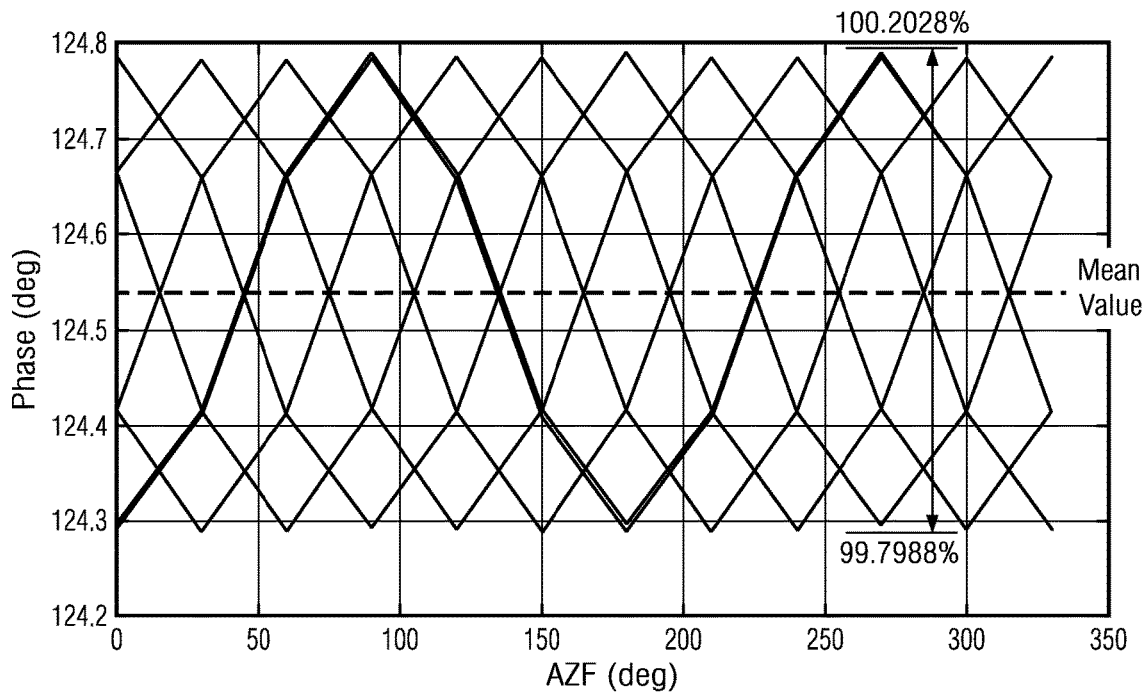

FIGS. 11A and 11B depict plots of the amplitude (11A) and phase (11B) of $V_{DC\_22}xx \cdot V_{DC\_11}zz$ versus formation dip azimuth for the above described tool eccentering azimuth iterations at a toolface angle of zero degrees. At first glance the denominator appears to be non-constant, however, note the vertical scale. The amplitude variation is within a range from about 99.94 to about 100.07 percent of the mean (a variation of about 0.1 percent). The phase variation is within a range from about 99.8 to about 100.2 percent of the mean (a variation of about 0.4 percent). Thus, based FIGS. 9A and 9B, 10A and 10B, and 11A and 11B, the denominator including DC harmonic coefficients is shown to be azimuthally invariant such that the gain compensated quantity retains the azimuthal response of the numerator.

Figure 12A:
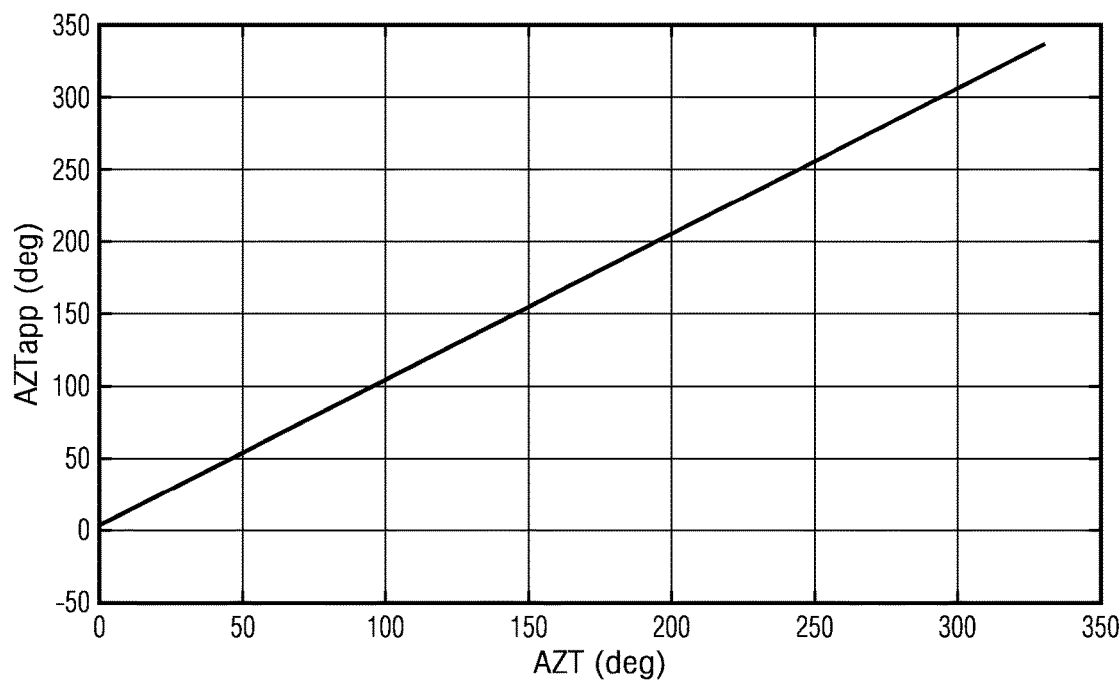
FIGS. 12A and 12B depict plots of the apparent formation dip azimuth computed using Equation 18 versus the modeled formation dip azimuth (12A) and the apparent tool eccentering azimuth computed using Equation 19 versus the modeled tool eccentering azimuth (12B) at an eccentering distance of 2 inches.
Figure 12B:
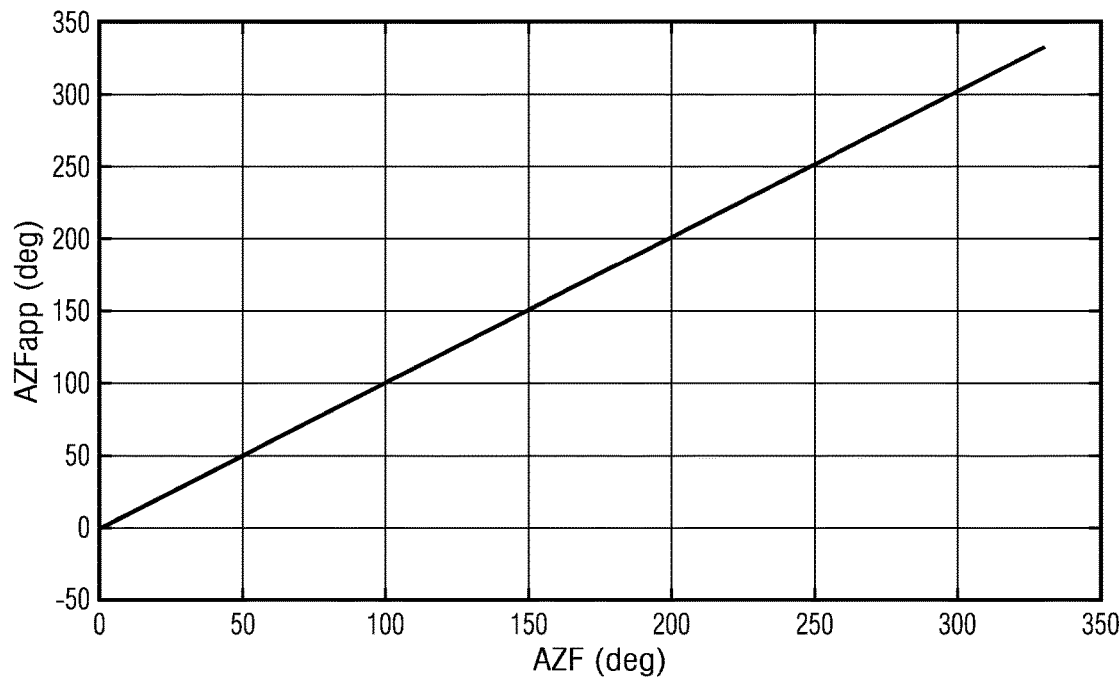

FIG. 12A depicts a plot of the apparent formation azimuth computed using Equation 18 versus the modeled formation azimuth for each of the 12 iterations of tool eccentering azimuth and FIG. 12B depicts a plot of the apparent tool eccentering azimuth computed using Equation 19 versus the modeled tool eccentering azimuth for each of the 12 iterations of formation dip azimuth at an eccentering distance of 2 inches. The model data further include a uniformly distributed random variation of transmitter and receiver gain mismatch of +/−10 percent in amplitude and +/−30 degrees in phase (as in the example depicted on FIGS. 7A and 7B).

With continued reference to FIGS. 12A and 12B, use of the fully gain compensated measurement quantities (e.g., as in Equations 18 and 19) eliminates the scatter due to gain mismatch and produces identical results to those shown on FIGS. 6A and 6B (where the twelve curves overlay one another and reproduce the modeled tool eccentering azimuth). Moreover, these plots further confirm that the denominator in the gain compensated quantities does not distort the azimuth properties of the numerator (as the plots in FIGS. 12A and 12B are identical to those in FIGS. 6A and 6B).

Figure 13A:
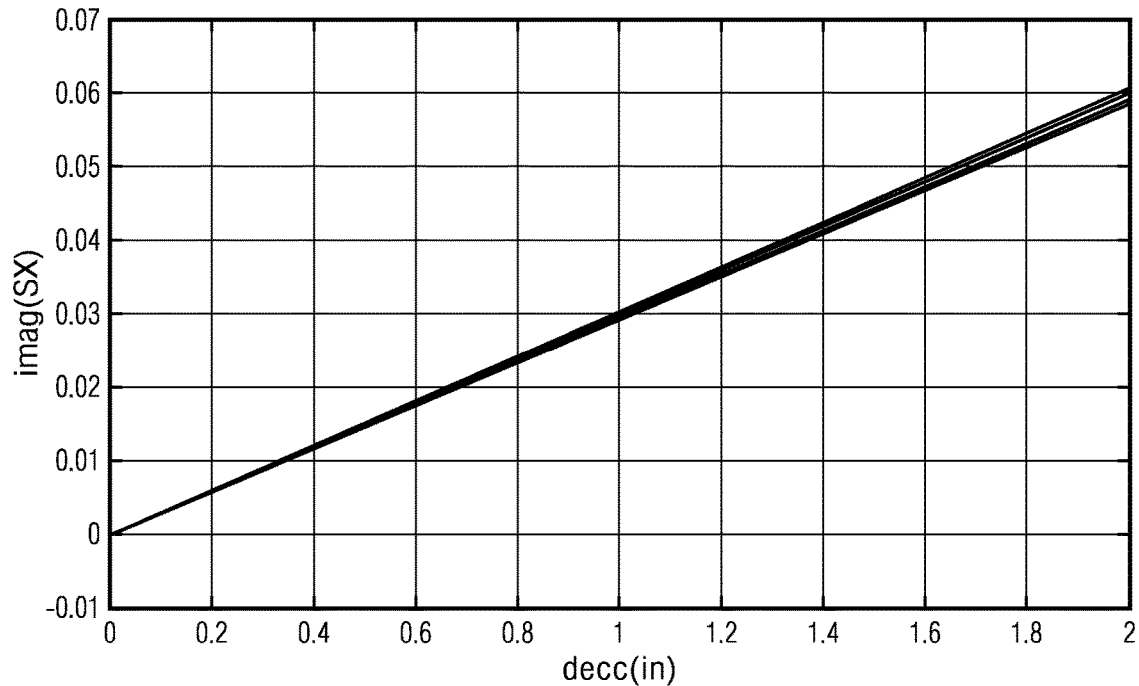
FIGS. 13A and 13B depict plots of the imaginary component of SX versus the tool eccentering distance decc (13A) and the apparent tool eccentering azimuth AZT (13B).
Figure 13B:
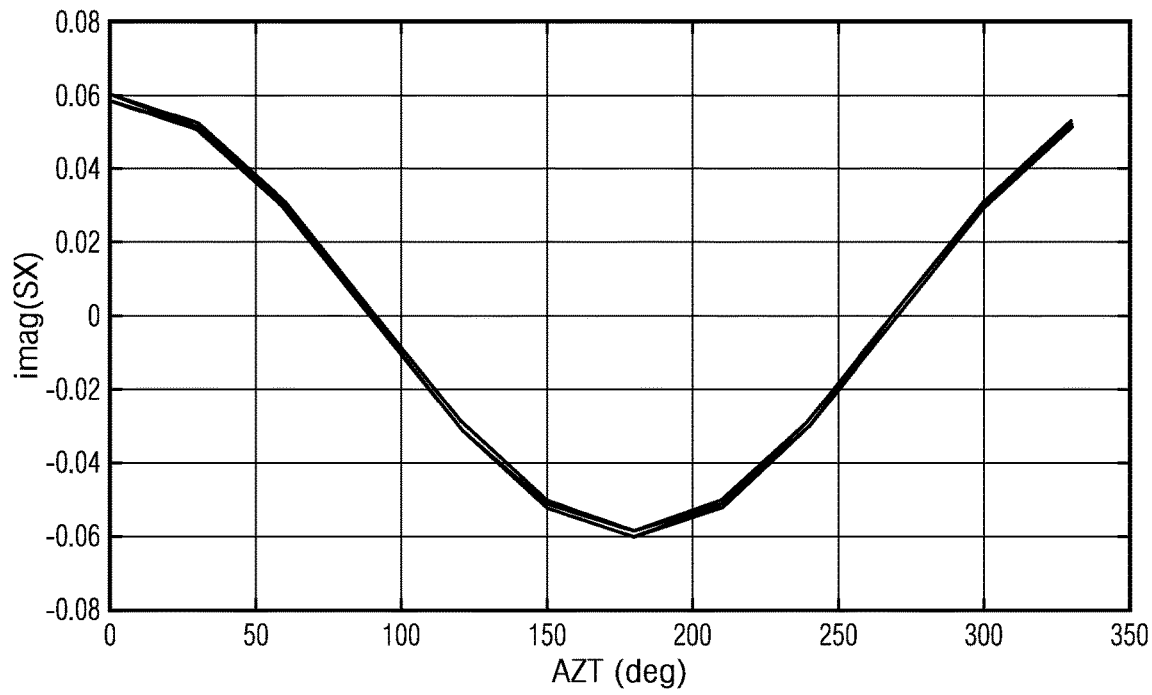

With reference now to FIGS. 13A and 13B, the tool eccentering distance decc may also be estimated from SX and/or SY, for example, as described above with respect to FIG. 20. FIG. 13A depicts a plot of the imaginary component of SX (when the apparent tool eccentering azimuth equals zero) versus the tool eccentering distance decc for each of the 12 iterations of formation dip azimuth described above. Note that imag (SX) is linear with decc with the slope being essentially independent of the formation dip azimuth such that imag(SX)=k·decc where k represents the slope of the line. In FIG. 3A k≈0.03 when AZT=0. FIG. 13B depicts a plot of imag(SX) versus the apparent tool eccentering azimuth AZT for each of the 12 iterations of formation dip azimuth described above. Note that imag(SX) may be approximated as a cosine function of the tool eccentering azimuth such that imag(SX)≈k·cos(AZT)·decc. Thus the slope of the line (the value of k) can be seen to depend on AZT such that the slope is a maximum when AZT=0,180 degrees.

It will be understood that the various methods disclosed herein for computing the apparent formation azimuth, the apparent tool eccentering azimuth, and/or the tool eccentering distance may be implemented on a on a downhole processor. By downhole processor it is meant an electronic processor (e.g., a microprocessor or digital controller) deployed in the drill string (e.g., in the electromagnetic logging tool or elsewhere in the BHA). In such embodiments, the computed quantities may be stored in downhole memory and/or transmitted to the surface while drilling via known telemetry techniques (e.g., mud pulse telemetry or wired drill pipe). Alternatively, the harmonic fitting coefficients or the compensated quantities may transmitted to the surface and the apparent formation azimuth, the apparent tool eccentering azimuth, and/or the tool eccentering distance may be computed at the surface using a surface processor. Whether transmitted to the surface or computed at the surface, the quantities may then be utilized in an inversion process (along with a formation model) to obtain various formation parameters as described above.

Although methods for estimating formation dip azimuth and tool eccentering azimuth have been described in detail, it should be understood that various changes, substitutions and alternations can be made herein without departing from the spirit and scope of the disclosure as defined by the appended claims.

What is claimed is:

1. A method for making downhole electromagnetic logging measurements of a horizontal resistivity and a vertical resistivity of an anisotropic subterranean formation, the method comprising:

(a) rotating an electromagnetic logging tool in a wellbore while drilling in the anisotropic subterranean formation, the logging tool including a transmitter axially spaced apart from a receiver, the transmitter including an axial transmitting antenna collocated with at least one transverse transmitting antenna, the receiver including an axial receiving antenna collocated with at least one transverse receiving antenna;

(b) applying a time varying electrical current to the axial transmitting antenna and to the at least one transverse transmitting antenna to transmit corresponding electromagnetic waves into the subterranean wellbore;

(c) causing the axial receiving antenna and the at least one transverse receiving antenna to receive each of the electromagnetic waves transmitted in (b) by measuring corresponding time varying voltages;

(d) processing the electromagnetic waves received in (c) to obtain harmonic voltage coefficients;

(e) processing ratios of selected ones of the harmonic voltage coefficients to compute gain compensated measurement quantities, wherein the harmonic voltage coefficients are selected such that the transmitter and receiver gains are fully canceled in each of the computed gain compensated measurement quantities;

(f) processing the gain compensated measurement quantities computed in (e) to compute an unknown apparent formation azimuth of the formation through which the wellbore traverses, an unknown apparent tool eccentering azimuth, and an unknown eccentering distance of the logging tool in the wellbore; and (g) processing the gain compensated measurement quantities computed in (e) and the apparent formation azimuth, the apparent tool eccentering azimuth, and the eccentering distance computed in (f) using an inversion to determine the horizontal resistivity and the vertical resistivity of the anisotropic subterranean formation.

2. The method of claim 1, wherein:
the gain compensated measurement quantities computed in (e) comprise xz and yz related off-diagonal coupling components; and
the apparent formation azimuth and the apparent tool eccentering azimuth are computed directly from the gain compensated measurement quantities using a mathematical equation having a closed form solution.

3. The method of claim 1, wherein (f) further comprises:
(i) processing the gain compensated measurement quantities computed in (e) to compute gain compensated symmetrized and anti-symmetrized quantities; and
(ii) processing at least one of the symmetrized and anti-symmetrized quantities to compute the apparent formation azimuth of the formation through which the wellbore traverses, the apparent tool eccentering azimuth, and the eccentering distance of the logging tool in the wellbore.

4. The method of claim 3, wherein the gain compensated symmetrized and anti-symmetrized quantities are computed using at least one of the following equations;

$$SX = CZX - CXZ$$

$$AX = CZX + CXZ$$

$$SY = CZY - CYZ$$

$$AY = CZY + CYZ$$

wherein SX and SY represent the symmetrized quantities, AX and AY represent the anti-symmetrized quantities, CXZ, CZX, CYZ, and CZY represent gain compensated quantities computed in (e) having the characteristics of corresponding xz, zx, yz, and zy tensors.

5. The method of claim 3, wherein the apparent formation azimuth is computed using the following equation:

$$AZF = \text{Mod}\left(-\text{atan2}(\text{imag}(AY), \text{imag}(AX)) \cdot \frac{180}{\pi}, 360\right)$$

wherein AZF represents the apparent formation azimuth, AX and AY represent the anti-symmetrized quantities, imag(•) represents the imaginary part of the quantity (•), a tan 2(•) represents the four quadrant inverse tangent function, and Mod(•) represents the modulo operation.

6. The method of claim 3, wherein the apparent tool eccentering azimuth is computed using the following equation:

$$AZT = \text{Mod}\left(-\text{atan2}(\text{imag}(SY), \text{imag}(SX)) \cdot \frac{180}{\pi}, 360\right)$$

wherein AZT represents the apparent tool eccentering azimuth, SX and SY represent the symmetrized quantities, imag(•) represents the imaginary part of the quantity (•), a tan 2(•) represents the four quadrant inverse tangent function, and Mod(•) represents the modulo operation.

7. The method of claim 3, wherein the eccentering distance is computed using at least one of the following equations:

$$decc = decc_m \cdot \left(\frac{\text{imag}(SX)}{\text{imag}(SX_m)}\right)$$

$$decc = decc_m \cdot \left(\frac{\text{imag}(SY)}{\text{imag}(SY_m)}\right)$$

wherein decc represents the eccentering distance, SX and SY represent the symmetrized quantities, $SX_m$ and $SY_m$ represent modeled symmetrized quantity values when $decc = decc_m$, and $decc_m$ represents a maximum eccentering distance for a given bit size BS and tool diameter $D_{tool}$ such that $decc_m = (BS - D_{tool})/2$.

8. The method of claim 1, wherein an azimuthal response of the harmonic voltage coefficients in a numerator of the ratios is preserved in the gain compensated measurement quantities computed in (e).

9. The method of claim 1, wherein the harmonic voltage coefficients in the denominator of the ratios are azimuthally invariant in the gain compensated measurement quantities computed in (e).

* * * * *